(12) United States Patent
Alm (10) Patent No.: US 11,809,072 B2
(45) Date of Patent: Nov. 7, 2023

(54) VEHICLE CAMERA HOLDING DEVICE

(71) Applicant: VEONEER SWEDEN AB, Vårgårda (SE)

(72) Inventor: Gustav Alm, Linköping (SE)

(73) Assignee: VEONEER SWEDEN AB, Vargarda (SE)

( * ) Notice: Subject to any disclaimer, the term of this patent is extended or adjusted under 35 U.S.C. 154(b) by 0 days.

(21) Appl. No.: 17/721,035

(22) Filed: Apr. 14, 2022

(65) Prior Publication Data
US 2022/0334461 A1 Oct. 20, 2022

(30) Foreign Application Priority Data

Apr. 14, 2021 (EP) ..................................... 21168421

(51) Int. Cl.
| | |
|---|---|
| *G03B 30/00* | (2021.01) |
| *B60R 11/04* | (2006.01) |
| *H04N 23/51* | (2023.01) |
| *H04N 23/54* | (2023.01) |
| *H04N 23/55* | (2023.01) |
| *B60R 11/00* | (2006.01) |

(52) U.S. Cl.
CPC .............. *G03B 30/00* (2021.01); *B60R 11/04* (2013.01); *H04N 23/51* (2023.01); *H04N 23/54* (2023.01); *H04N 23/55* (2023.01); *B60R 2011/0066* (2013.01); *B60R 2011/0071* (2013.01)

(58) Field of Classification Search
None
See application file for complete search history.

(56) References Cited

U.S. PATENT DOCUMENTS

| | | | |
|---|---|---|---|
| 8,861,951 B2 | 10/2014 | Warren et al. | |
| 10,205,865 B2 | 2/2019 | Han | |
| 2013/0142504 A1 | 6/2013 | Warren et al. | |
| 2017/0155814 A1 | 6/2017 | Han | |
| 2021/0197733 A1* | 7/2021 | Percival | B60R 1/00 |
| 2022/0103723 A1* | 3/2022 | Skrocki | H05K 1/181 |

FOREIGN PATENT DOCUMENTS

KR 10-201900027078 A 3/2019

OTHER PUBLICATIONS

European Search Report of EP 21168421.2, dated Sep. 10, 2021.

\* cited by examiner

*Primary Examiner* — Rodney E Fuller
(74) *Attorney, Agent, or Firm* — DICKINSON WRIGHT PLLC (57) ABSTRACT

A vehicle camera module (1) that includes a lens assembly (2) and a printed circuit board assembly (3) to which an image sensor (4) and associated components are mounted. The lens assembly (2) includes a camera module holder (5) and a camera lens (6), the camera lens (6) having a longitudinal extension (L) and a lens aperture (7), where the camera lens (6) at least partly is housed in the camera module holder (5). The camera module holder (5) includes at least two guide arms (8a, 8b, 8c) that are adapted to extend past corresponding printed circuit board edges (9a, 9b, 9c), the PCB assembly (3) being mounted such that the image sensor (4) faces the camera lens (6).

13 Claims, 10 Drawing Sheets

VEHICLE CAMERA HOLDING DEVICE

CROSS-REFERENCE TO RELATED APPLICATIONS

This application claims the benefit of priority under 35 U.S.C. § 119 to European Patent Application No. 21168421.2, filed Apr. 14, 2021, the contents of which are incorporated herein by reference in their entirety.

FIELD OF THE INVENTION

The present disclosure relates to a digital camera device that having a camera housing and at least one vehicle camera module that is mounted to the camera housing. The camera module includes a lens assembly and a printed circuit board (PCB) to which an image sensor and associated components are mounted.

BACKGROUND

Many vehicle environment detection systems feature one or more sensors such as for example radar sensor, LIDAR sensors, ultrasonic sensors and digital camera devices. These are used for collecting data used for safety arrangements as well as for driver assistance systems. A camera device is adapted to collect images of the surroundings, and may be used to identify landmarks.

For a digital camera device, that can be in the form of a vehicle imaging system having a camera module mounted to a camera housing. The camera module includes a lens assembly and a PCB to which an image sensor and associated components are mounted.

It is an object of the present disclosure to provide embodiments providing for a secure, efficient and reliable mounting of the camera module to the camera housing.

SUMMARY

The above-referenced object is achieved by embodiments of a vehicle camera module that includes a lens assembly and a printed circuit board (PCB) assembly to which an image sensor and associated components are mounted. The lens assembly includes a camera module holder and a camera lens that has a longitudinal extension and a lens aperture. The camera lens is at least partly housed in the camera module holder, where the camera module holder includes at least two guide arms that are adapted to extend past corresponding PCB edges. The PCB assembly is mounted such that the image sensor faces the camera lens.

In this manner, a versatile vehicle camera module is provided.

According to some aspects of embodiments of the present invention, the guide arms at least partly extend parallel to the longitudinal extension.

This means that the guide arms either can extend parallel to the longitudinal extension, or at such an angle to the longitudinal extension that the guide arms partly extend parallel to the longitudinal extension.

According to some aspects of embodiments of the present invention, the guide arms are adapted to stay clear from the PCB edges.

This means that the PCB assembly with the image sensor can be aligned with the camera lens without any influence from the guide arms.

The above-referenced object is also achieved by an embodiment of a vehicle camera device that includes a camera housing and the vehicle camera module according to the above. The camera housing includes an aperture through which a part of the lens assembly is adapted to protrude. The vehicle camera device further includes a holding member that is adapted to be fastened to the camera housing and to be in retaining contact with the guide arms while maintaining a certain distance to the PCB assembly such that the vehicle camera module is securely fixed in the camera housing.

This means that no external force is applied to the PCB assembly during mounting. The holding member is adapted to be fastened to the camera housing such that a mechanical stop between the holding member and the camera housing, and the properties of the holding member itself, defines the retaining force applied to the guide arms and the vehicle camera module.

According to some aspects, each guide arm includes a contact surface that is adapted to contact the holding member.

According to some aspects, the holding member includes a main part and one holding arm for each guide arm. Each holding arm extends from the main part towards the corresponding contact surface in a direction parallel to the longitudinal extension and is adapted to abut a corresponding contact surface.

This means that the holding arms extend from the main part towards the corresponding contact surface in a direction parallel to the longitudinal extension when the holding member is mounted, and that the holding arms also may extend from the main part in another direction.

According to some aspects of embodiments of the present invention, each holding arm also protrudes radially outwards from the main part.

According to some aspects of embodiments of the present invention, each holding arm is formed separately and attached to the main part.

According to some aspects of embodiments of the present invention, the holding member is mainly formed in metal. Alternatively, the holding member is mainly formed in a rubber material and/or a plastic material.

Changing the properties of the holding member, such as for example its design and the material or materials it is made in, will change the retaining force. Accordingly, by choosing an appropriate design and material of the holding member, a desired retaining force can be obtained.

According to some aspects of embodiments of the present invention, the holding member includes screw apertures adapted to receive fastening screws to be attached to screw receiving flanges of the camera housing, securing the holding member towards the camera housing and the guide arms.

According to some aspects of embodiments of the present invention, each screw aperture is formed in separate metal inserts.

In this way, an enhanced rigidity for is provide for the screw attachment, reducing the risk of damage to the holding member.

According to some aspects of embodiments of the present invention, the holding member includes attachment arms that are adapted to extend towards receiving flanges of the camera housing. The attachment arms and the receiving flanges are arranged for a snap-fit connection that is adapted to secure the holding member towards the camera housing and the guide arms.

In this way, an uncomplicated mounting that does not require any tools is enabled.

According to some aspects of embodiments of the present invention, the camera module holder includes at least three module guides, where each module guide is adapted to be received in a corresponding guiding ridge of the camera housing.

In this way, the camera module can be securely positioned in a predetermined manner in the camera housing.

The above-described object is also achieved by means of methods associated with the above advantages.

BRIEF DESCRIPTION OF THE DRAWINGS

The present disclosure will now be described more in detail with reference to the appended drawings, where.

DETAILED DESCRIPTION

Aspects of the present disclosure will now be described more fully hereinafter with reference to the accompanying drawings. The different devices, systems, computer programs and methods disclosed herein can, however, be realized in many different forms and should not be construed as being limited to the aspects set forth herein. Like numbers in the drawings refer to like elements throughout.

The terminology used herein is for describing aspects of the disclosure only and is not intended to limit the invention. As used herein, the singular forms "a", "an" and "the" are intended to include the plural forms as well, unless the context clearly indicates otherwise.

Figure 1:
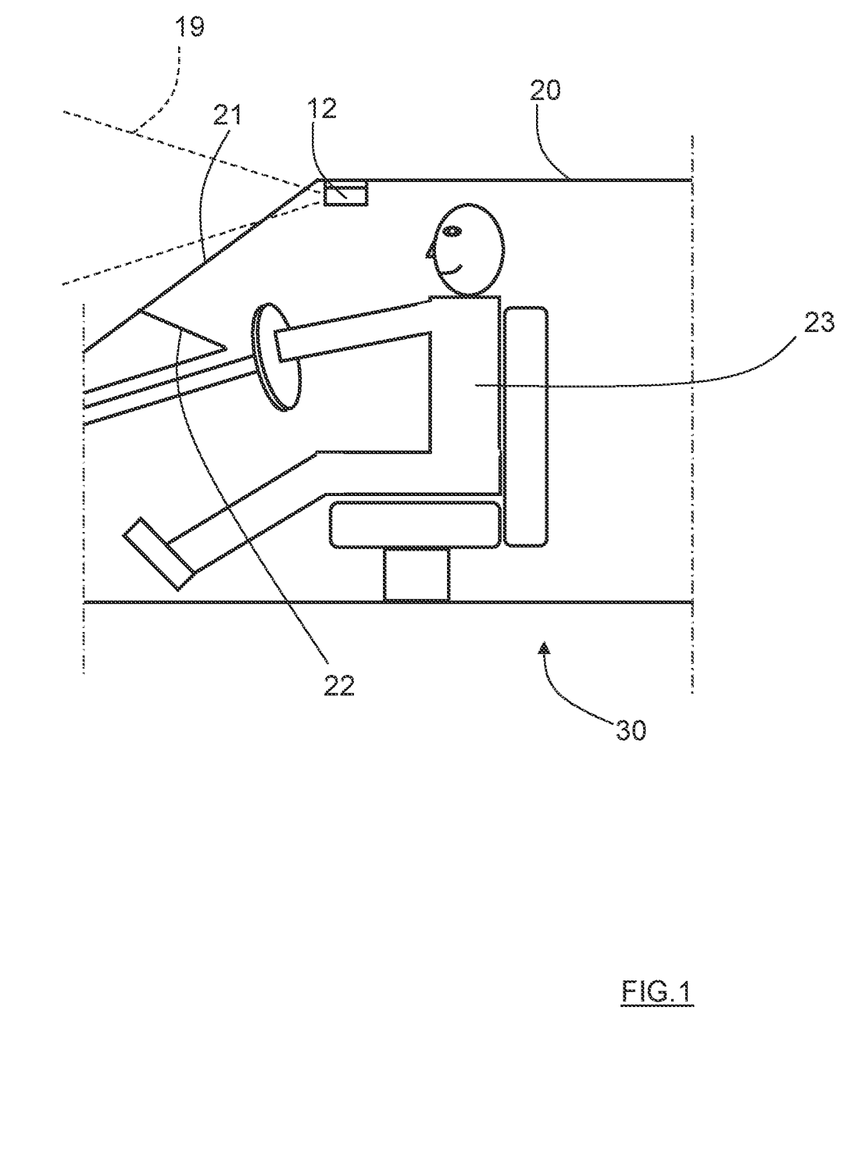
FIG. 1 shows a schematic cut-open part of a vehicle with a camera device.

FIG. 1 schematically shows a cut-open part of a vehicle 30, where the vehicle 30 includes a digital camera device 12. The digital camera device 12 is arranged for capturing images of the surroundings outside the vehicle 30 by means of a certain field of view 19. A digital camera device 12 can also, or alternatively, be arranged for capturing images of a driver 23, where these images, which may include eye movements, for example can be used for detecting a degree of driver drowsiness.

Figure 2:
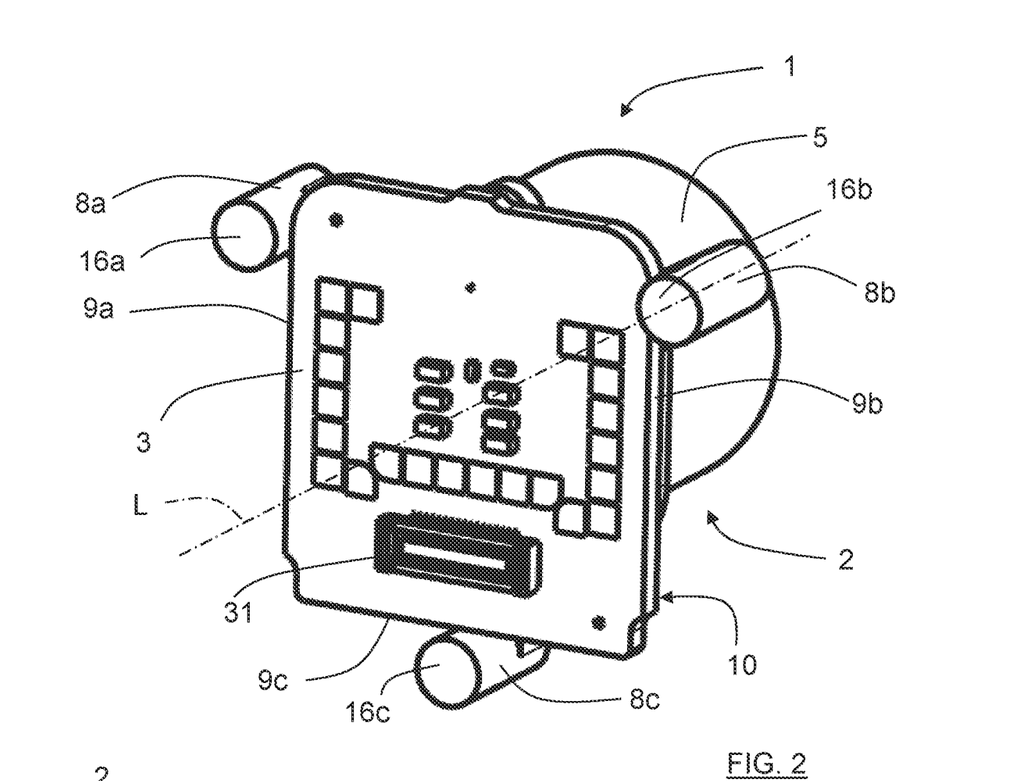
FIG. 2 shows a schematic back perspective view of vehicle camera module.
Figure 3:
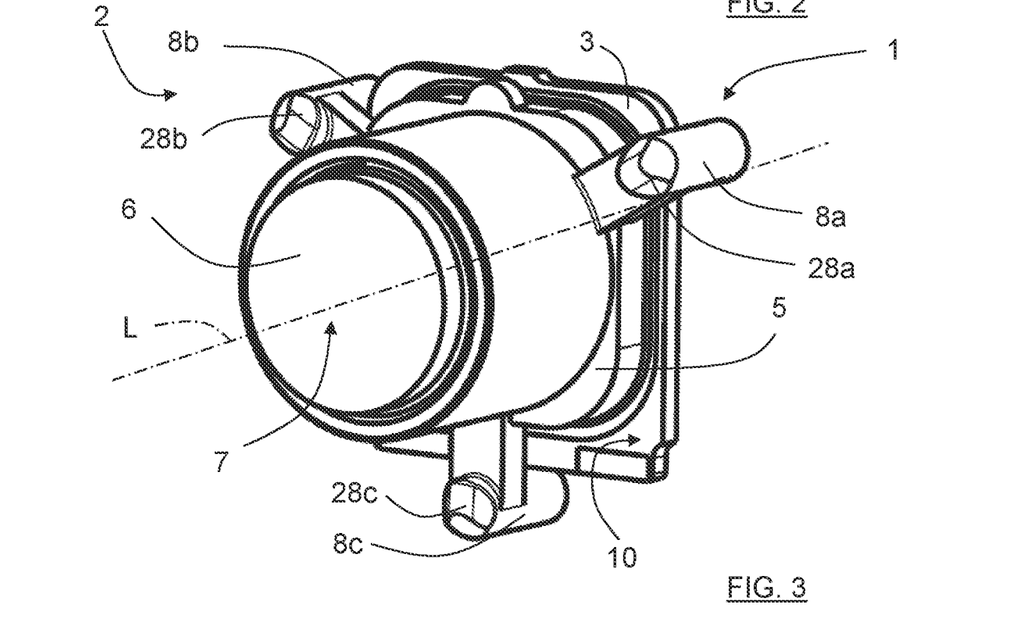
FIG. 3 shows a schematic front perspective view of vehicle camera module.
Figure 4:
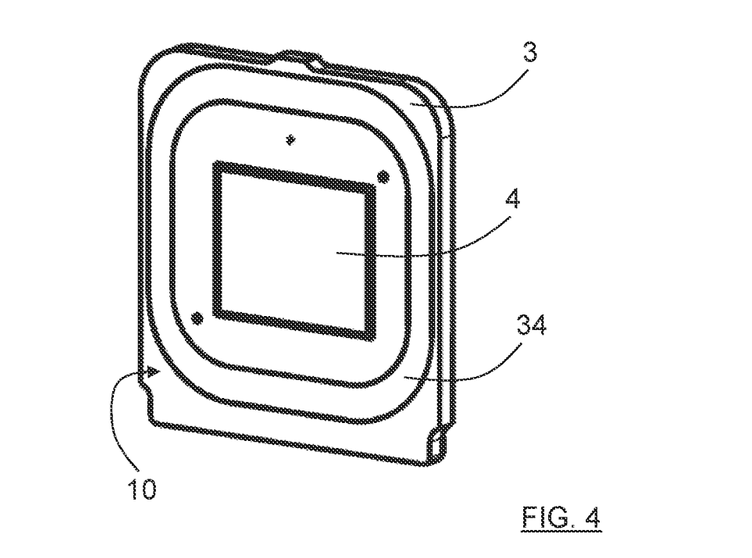
FIG. 4 shows a schematic perspective view of a PCB with an image sensor.
Figure 5:
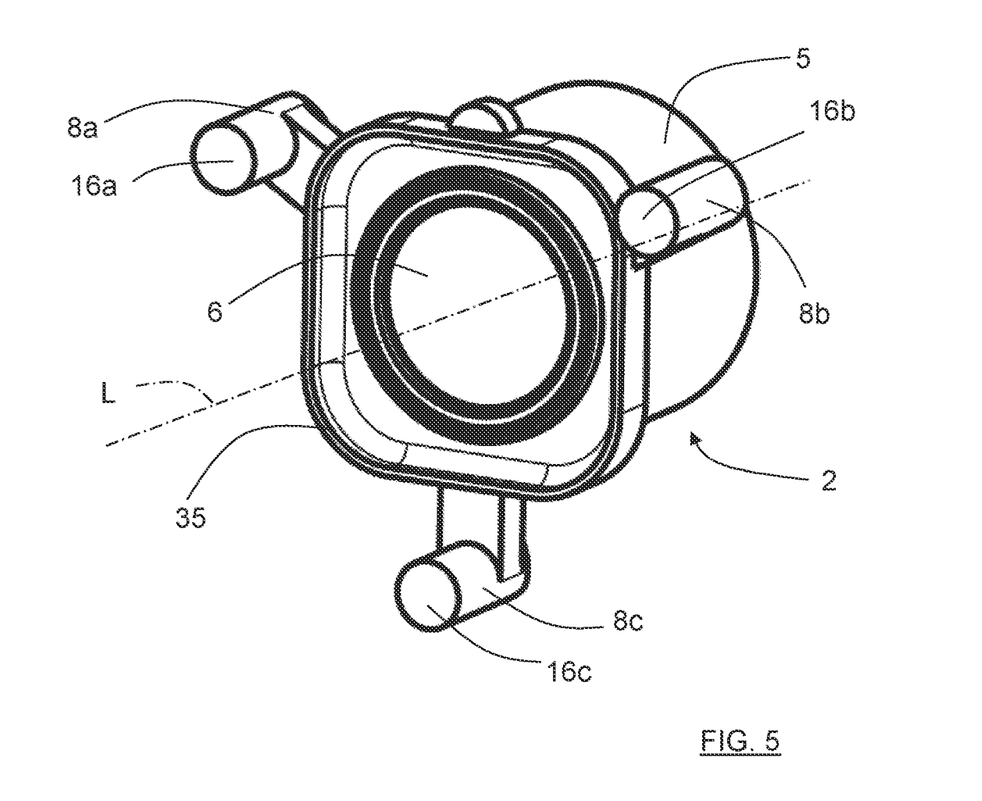
FIG. 5 shows a schematic back perspective view of a lens assembly.

FIG. 2 and FIG. 3 shows perspective views of a vehicle camera module 1 that includes a lens assembly 2 and a printed circuit board (PCB) assembly 3. With reference also to FIG. 4, an image sensor 4 and associated components are mounted to the PCB assembly 3. FIG. 5 shows a schematic back perspective view of the lens assembly 2, and according to some aspects, a slot 34 is formed in the PCB assembly 3 and adapted to receive an edge 35 formed in the lens assembly 2. According to some further aspects, the slot 34 and the edge 35 corresponding circumferential shapes.

According to the present disclosure, the lens assembly 2 includes a camera module holder 5 and a camera lens 6, the camera lens 6 having a longitudinal extension L and a lens aperture 7. The camera lens 6 is at least partly housed in the camera module holder 5.

The longitudinal extension L extends as a symmetry line for the camera lens 6. According to some aspects, the longitudinal extension L is the lens axis for the camera lens 6.

Furthermore, the camera module holder 5 includes at least two guide arms 8a, 8b, 8c that are adapted to extend past corresponding PCB edges 9a, 9b, 9c, the PCB assembly 3 being mounted such that the image sensor 4 faces the camera lens 6. According to some aspects, preferably, the camera module holder 5 includes at least three guide arms 8a, 8b, 8c, and in the present example there are three guide arms 8a, 8b, 8c.

In this manner, a versatile vehicle camera module 1 is provided.

According to some aspects of embodiments of the present invention, the guide arms 8a, 8b, 8c at least partly extend parallel to the longitudinal extension L. This means that the guide arms 8a, 8b, 8c either can extend parallel to the longitudinal extension L, or at such an angle to the longitudinal extension L that the guide arms 8a, 8b, 8c partly extend parallel to the longitudinal extension L.

According to some aspects of embodiments of the present invention, the guide arms 8a, 8b, 8c are adapted to stay clear from the PCB edges 9a, 9b, 9c. This means that the PCB assembly 3 with the image sensor 4 can be aligned with the camera lens 6 without any influence from the guide arms 8a, 8b, 8c.

With reference also to FIG. 6 through FIG. 10, there is vehicle camera device 12 according to a first example that includes a camera housing 13 and the vehicle camera module 1 according to the above. The camera housing 13 includes an aperture 14 through which a part of the lens assembly 2 is adapted to protrude.

In accordance with the present disclosure, the vehicle camera device 12 further includes a holding member 15 that is adapted to be fastened to the camera housing 13 and to be in retaining contact with the guide arms 8a, 8b, 8c while maintaining a certain distance to the PCB assembly 3 such that the vehicle camera module 1 is securely fixed in the camera housing 13.

This means that no force is applied to the PCB assembly 3 during mounting. The holding member 15 is adapted to be fastened to the camera housing 13 such that a mechanical stop between the holding member 15 and the camera housing 13, and the properties of the holding member 15 itself, defines the retaining force applied to the guide arms 8a, 8b, 8c and the vehicle camera module 1. Only changing the properties of the holding member 15, such as for example its design and the material or materials it is made in, will change the retaining force. According to some aspects, the holding member 15 is mainly formed in metal.

Figure 6:
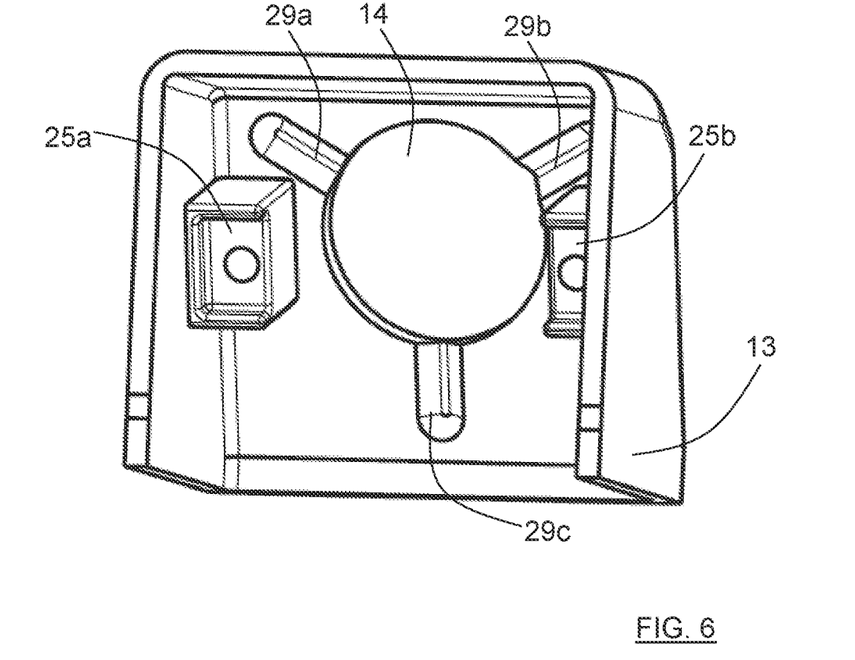
FIG. 6 shows a schematic back perspective view of a camera housing.

According to some aspects of embodiments of the present invention, as shown in FIG. 3, the camera module holder 5 includes at least three module guides 28a, 28b, 28c, where each module guide 28a, 28b, 28c, is adapted to be received in a corresponding guiding ridge 29a, 29b, 29c of the camera housing 13 shown in FIG. 6. Here there are three module guides 28a, 28b, 28c which are formed at the ends of the guide arm 8a, 8b, 8c which are adapted to face the camera housing 13.

According to some aspects of embodiments of the present invention, each module guide 28a, 28b, 28c has a spherical shape, and each guiding ridge 29a, 29b, 29c has a U-shape or V-shape.

According to some aspects of embodiments of the present invention, each guide arm 8a, 8b, 8c includes a contact surface 16a, 16b, 16c that is adapted to contact the holding member 15.

Figure 7:
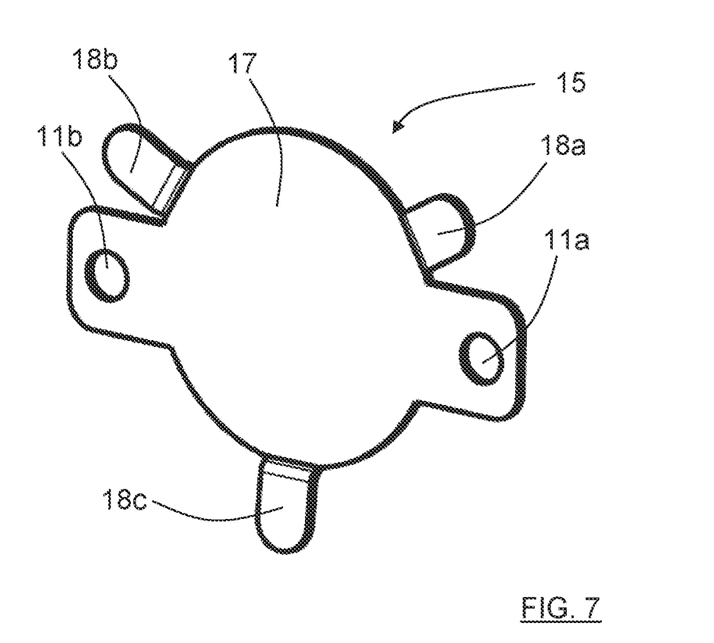
FIG. 7 shows a schematic perspective view of a holding member according to a first example.

According to some aspects of embodiments of the present invention, as in particular shown in FIG. 7, the holding member 15 includes a main part 17 and one holding arm 18a, 18b, 18c for each guide arm 8a, 8b, 8c, where each holding arm 18a, 18b, 18c extends from the main part 17 towards the corresponding contact surface 16a, 16b, 16c in a direction parallel to the longitudinal extension L and is adapted to abut a corresponding contact surface 16a, 16b, 16c.

This means that the holding arms 18a, 18b, 18c extend from the main part 17 towards the corresponding contact surface 16a, 16b, 16c in a direction parallel to the longitudinal extension L when the holding member 15 is mounted, and that the holding arms 18a, 18b, 18c also may extend from the main part 17 in another direction.

As shown in FIG. 7, according to some aspects of embodiments of the present invention, each holding arm 18a, 18b, 18c also protrudes radially outwards from the main part 17. This is the case for the holding member 15 according to the first example.

The holding member 15 includes screw apertures 11a, 11b adapted to receive fastening screws 24a, 24b to be attached to screw receiving flanges 25a, 25b of the camera housing 13, securing the holding member 15 towards the camera housing 13 and the guide arms 8a, 8b, 8c. This means that mounting in a vertical assembly station is made possible. It can easily be checked that the screws are correctly tightened, alleviating a need for an extra inspection station.

Figure 8:
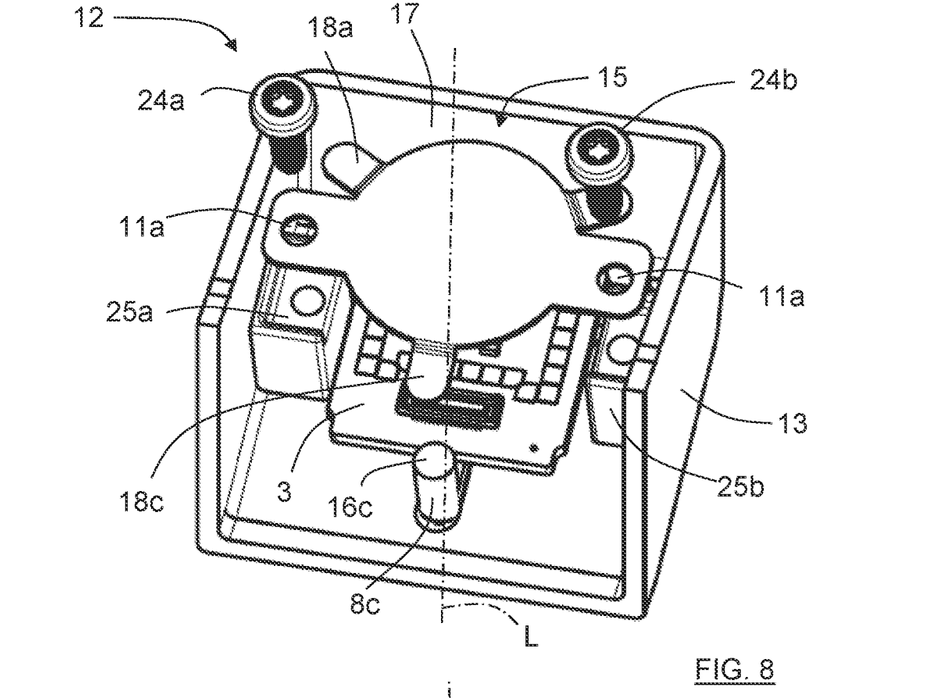
FIG. 8 shows a schematic perspective back view of a camera device before mounting the holding member according to the first example.
Figure 9:
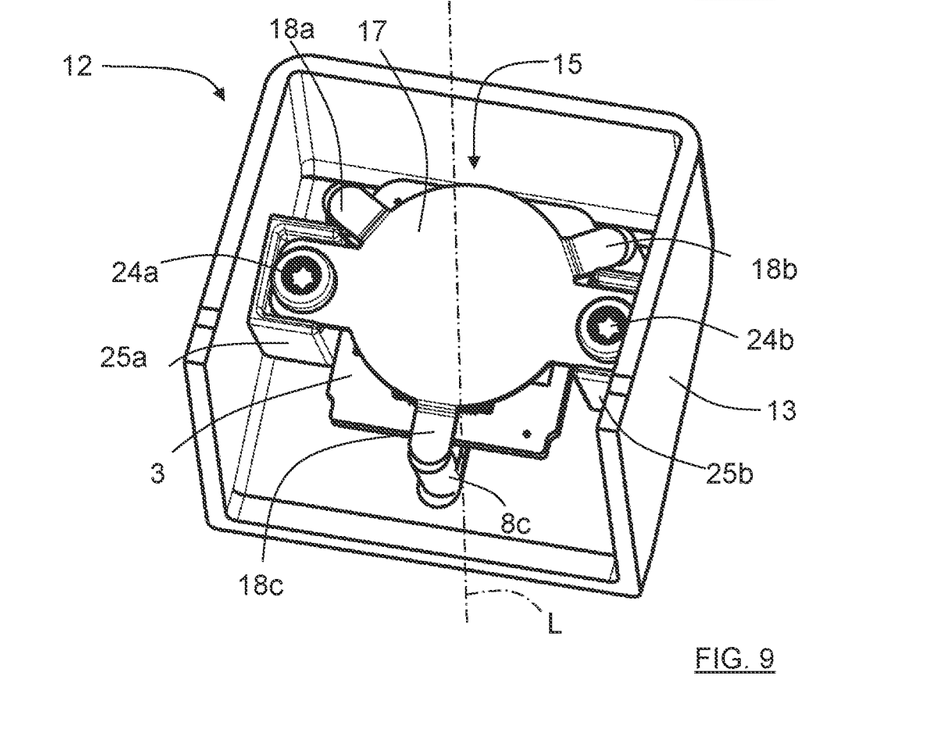
FIG. 9 shows a schematic perspective back view of the camera device with mounted holding member according to the first example.
Figure 10:
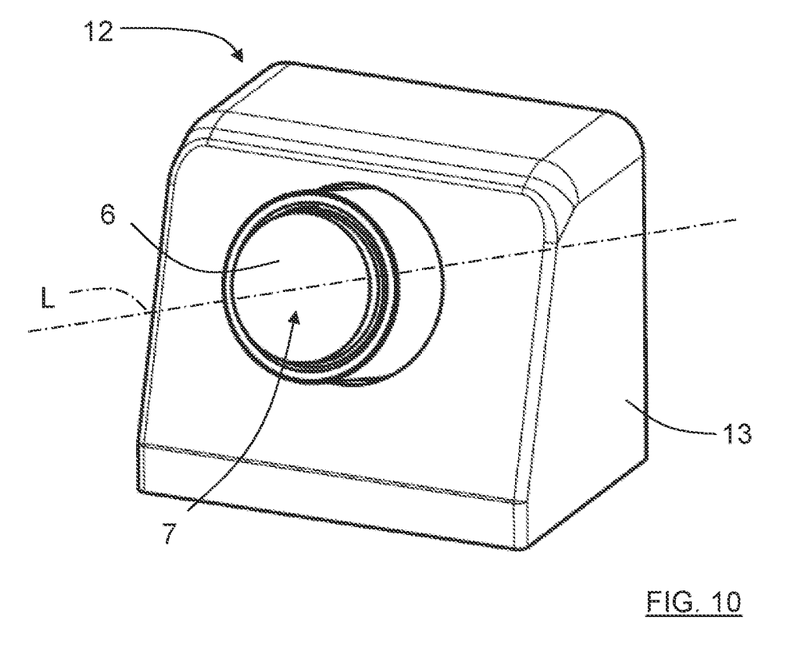
FIG. 10 shows a schematic perspective front view of the camera device according to the first example.
Figure 11A:
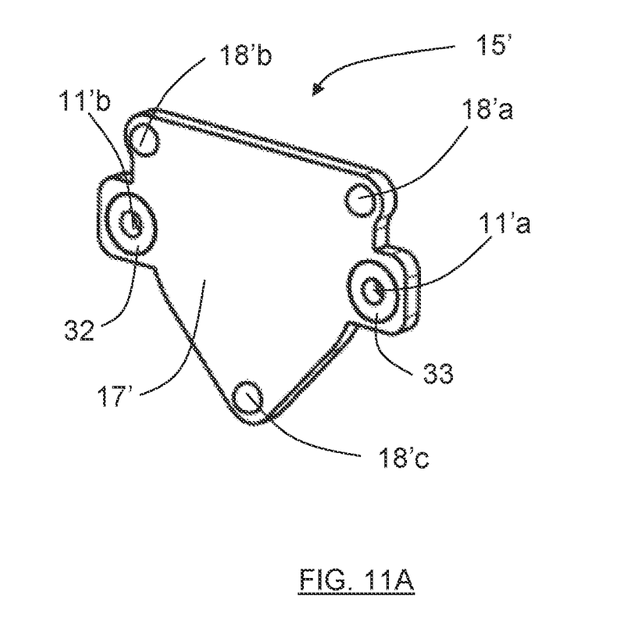
FIG. 11A shows a schematic perspective view of a holding member according to a second example.
Figure 11B:
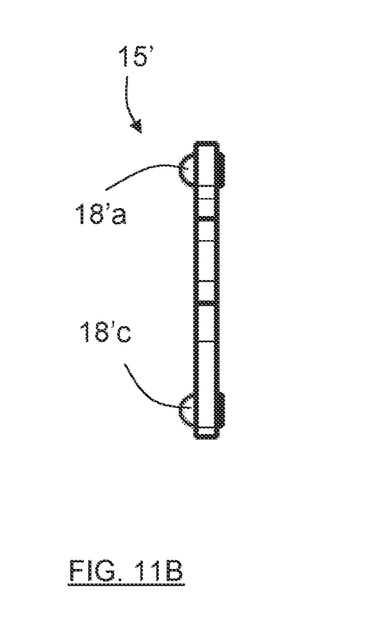
FIG. 11B shows a schematic side view of the holding member according to the second example.

In FIG. 8, it is shown how the holding member 15 and the fastening screws 24a, 24b are about to be mounted, and in FIG. 9, the holding member 15 and the fastening screws 24a, 24b are shown mounted. FIG. 10 shows a front perspective view of the vehicle camera device 12 when the holding member 15 and the fastening screws 24a, 24b are mounted. The fastening screws 24a, 24b have been tightened such that threads of the fastening screws 24a, 24b have been brought into engagement with corresponding threads in the screw receiving flanges 25a, 25b of the camera housing 13.

With reference to FIG. 11A through FIG. 14, an alternative vehicle camera device 12' according to a second example is shown. The difference lies in the design of the holding member, here a holding member 15' according to the second example. As in particular shown in FIG. 11A and FIG. 11B, the holding arms 18'a, 18'b, 18'c extend from the main part 17' towards the corresponding contact surface 16a, 16b, 16c only in a direction parallel to the longitudinal extension L when the holding member 15' is mounted.

This provides an alternative design of the holding member 15', enabling other types of adjustment of said retaining force.

According to some aspects of embodiments of the present invention, each holding arm 18'a, 18'b, 18'c is formed separately and attached to the main part. This way, the holding arms 18'a, 18'b, 18'c can be designed separately from the rest of the holding member, allowing further means of adjustment of the retaining force. For example, the choice of material in the holding arms 18'a, 18'b, 18'c is not limited to the material of the main part 17'.

Here, the holding member 15' is mainly formed in a rubber material and/or a plastic material, for example a thermoplastic elastomer. This reduces the risk of metal particles getting loose from the holding member 15' and interfering with electronics and other parts. According to some aspects of embodiments of the present invention, each screw aperture 11'a, 11'b is formed in separate metal inserts 32, 33. In this way, the screws can be securely tightened in a controlled manner as mentioned above.

Figure 12:
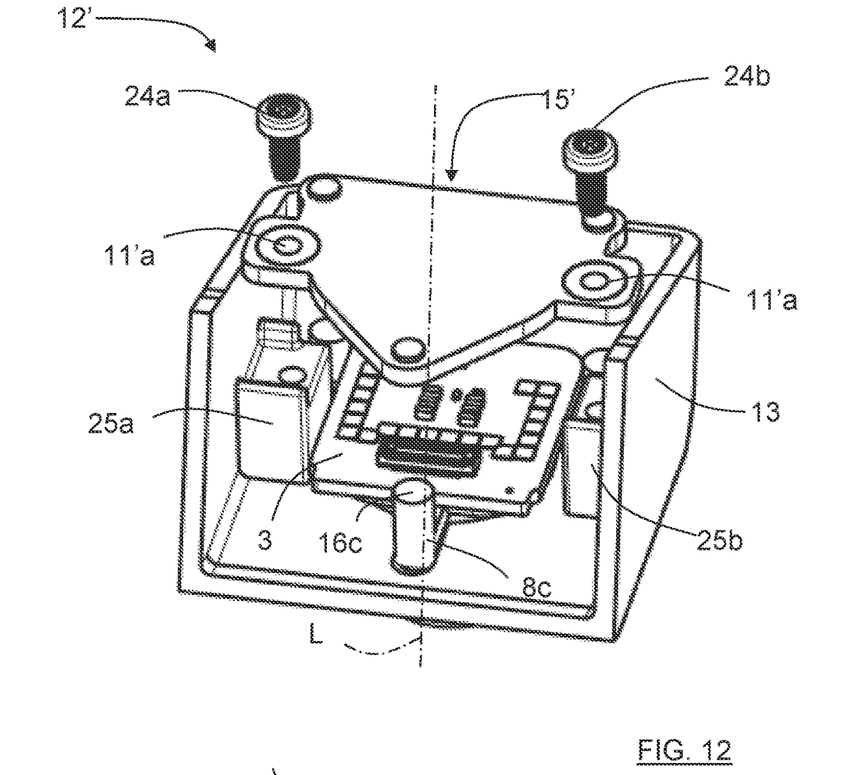
FIG. 12 shows a schematic perspective back view of a camera device before mounting the holding member according to the second example.
Figure 13:
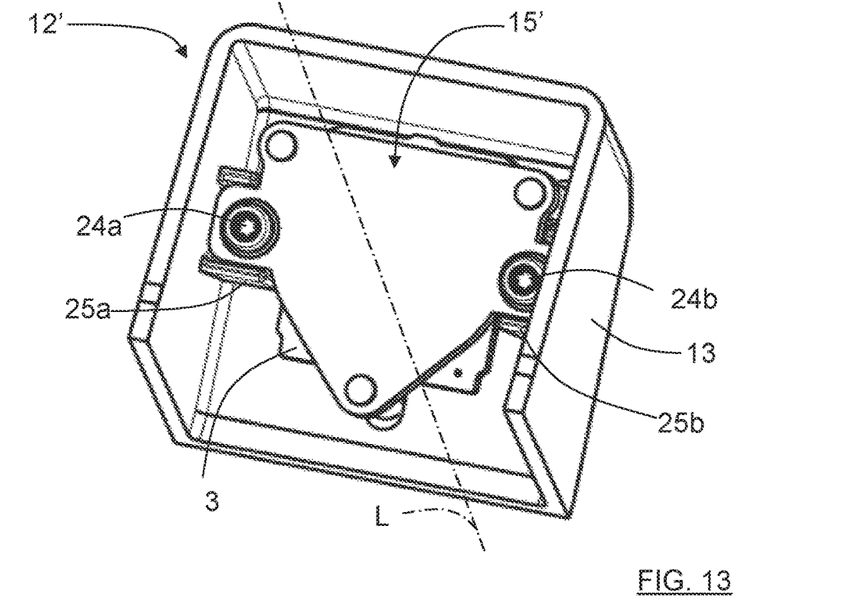
FIG. 13 shows a schematic perspective back view of the camera device with mounted holding member according to the second example.
Figure 14:
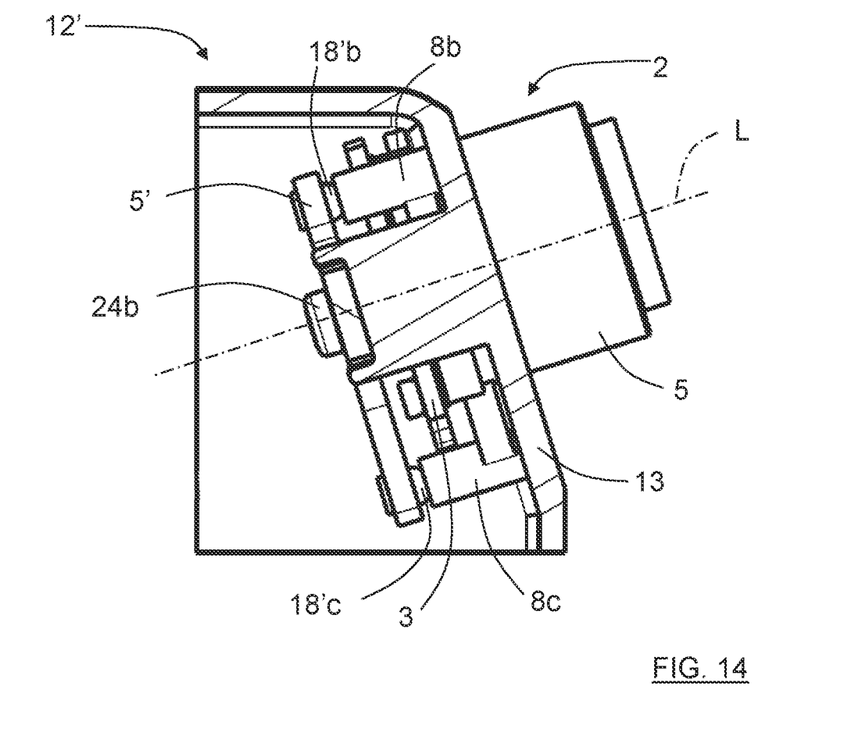
FIG. 14 shows a schematic side section view of the camera device with mounted holding member according to the second example.

In FIG. 12, it is shown how the holding member 15' and the fastening screws 24a, 24b are about to be mounted, and in FIG. 13, the holding member 15' and the fastening screws 24a, 24b are shown mounted. FIG. 14 shows a section side view of the vehicle camera device 12' when the holding member 15' and the fastening screws 24a, 24b are mounted. The fastening screws 24a, 24b have been tightened such that threads of the fastening screws 24a, 24b have been brought into engagement with corresponding threads in the screw receiving flanges 25a, 25b of the camera housing 13. The holding arms 18'a, 18'b, 18'c can be slightly resilient such that they are slightly deformed when the fastening screws 24a, 24b are tightened. Since the tightening is made in a controlled manner, the deformation arises in a controlled manner as well.

With reference to FIG. 15A through FIG. 18, an alternative vehicle camera device 12' according to a second example is shown. Here, the holding member 15" includes attachment arms 26a, 26b that are adapted to extend towards receiving flanges 27a, 27b of the camera housing 13". The attachment arms 26a, 26b and the receiving flanges 27a, 27b are arranged for a snap-fit connection that is adapted to secure the holding member 15" towards the camera housing 13" and the guide arms 8a, 8b, 8c.

This means that no additional fastening screws are needed.

Figure 15A:
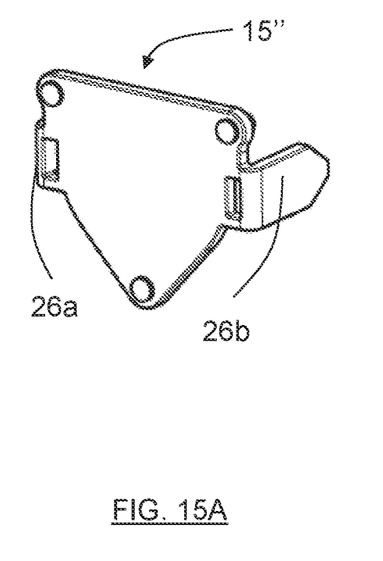
FIG. 15A shows a schematic first perspective view of a holding member according to a third example.
Figure 15B:
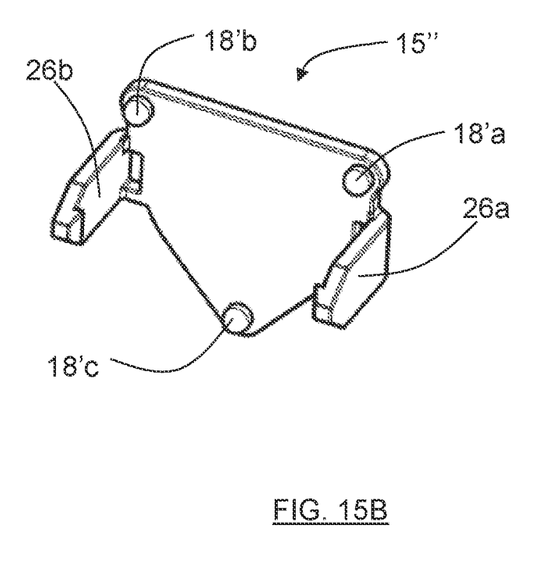
FIG. 15B shows a schematic second perspective view of the holding member according to the third example.

The holding member 15" is illustrated in detail in FIG. 15A and FIG. 15B, and as in the second example, the holding arms 18'a, 18'b, 18'c extend from the main part 17' towards the corresponding contact surface 16a, 16b, 16c only in a direction parallel to the longitudinal extension L when the holding member 15" is mounted.

Figure 16:
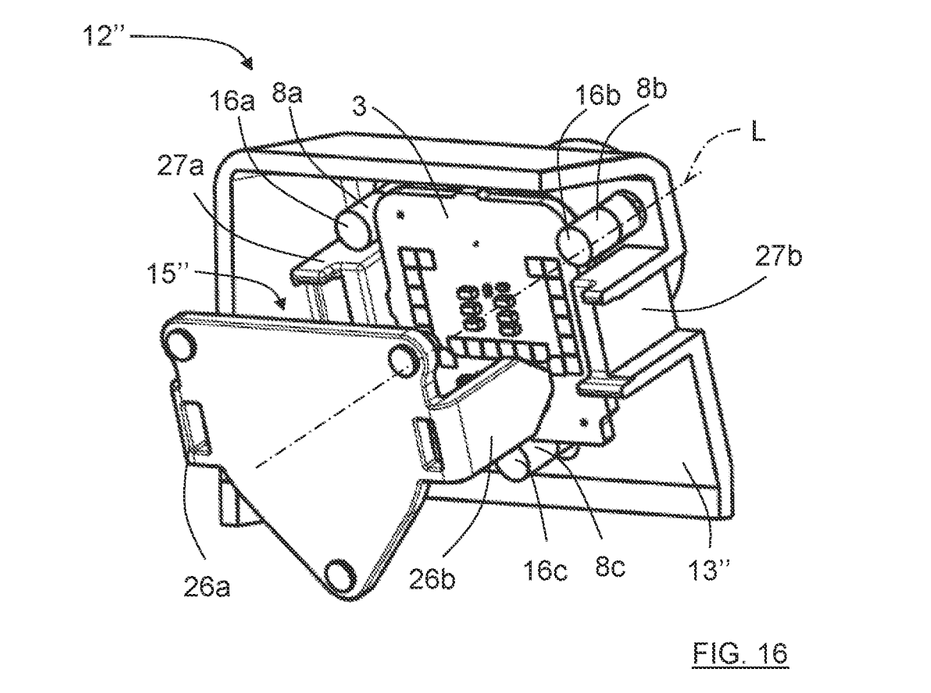
FIG. 16 shows a schematic perspective back view of a camera device before mounting the holding member according to the third example.
Figure 17:
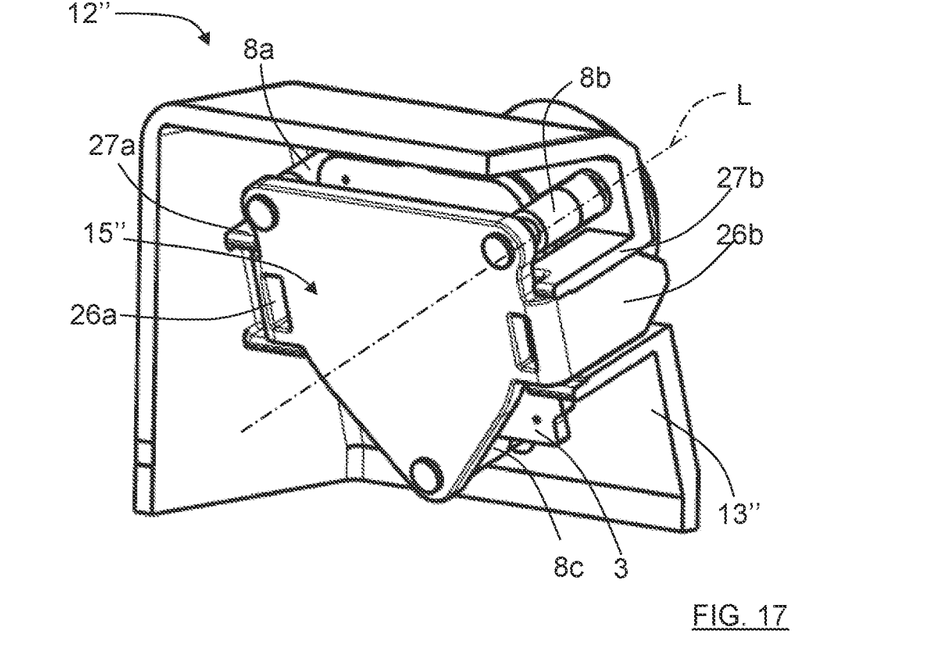
FIG. 17 shows a schematic perspective back view of the camera device with mounted holding member according to the third example.
Figure 18:
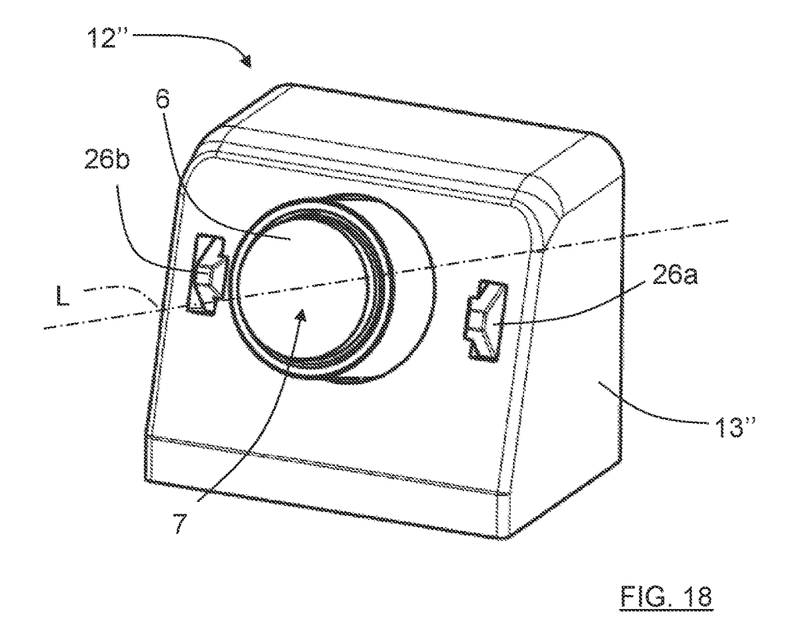
FIG. 18 shows a schematic perspective front view of the camera device according to the third example.

In FIG. 16, it is shown how the holding member 15" is about to be mounted, and in FIG. 17, the holding member 15" is shown mounted. FIG. 18 shows a perspective front view of the vehicle camera device 12" when the holding member 15" is mounted.

In this way, the risk of metal particles getting loose during a screwing process and interfering with electronics and other parts is reduced. The holding members 15" can be easily and quickly installed, and as evident from FIG. 18, the snap fits are easy to inspect from outside when mounted.

The holding arms 18'a, 18'b, 18'c can be slightly resilient such that they are slightly deformed when the attachment arms 26a, 26b are brought into engagement with the receiving flanges 27a, 27b. In this way, the attachment arms 26a, 26b are firmly and securely retained in the receiving flanges 27a, 27b.

Figure 19:
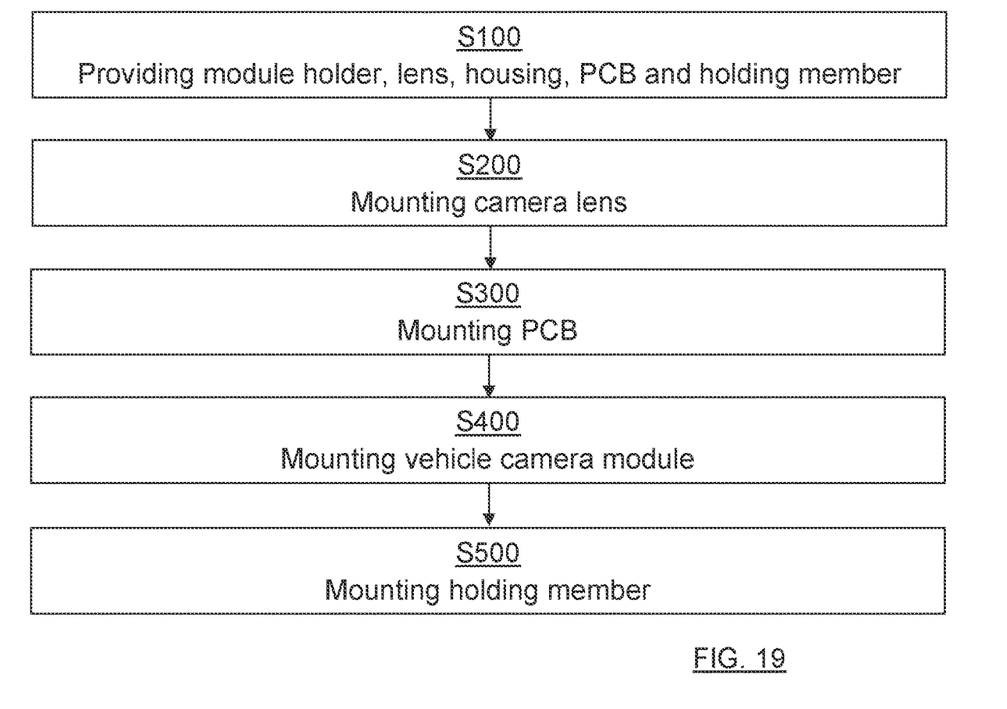
FIG. 19 shows a flowchart for methods according to the present disclosure.

With reference to FIG. 19, the present disclosure also relates to a method for mounting a vehicle camera device 12. The method includes providing S100 a camera module holder 5, a camera lens 6, a camera housing 13, at least one printed circuit board, PCB, assembly 3 to which an image sensor 6 and associated components are mounted, and a holding member 15, the camera lens 6 having a longitudinal extension L, and mounting S200 the camera lens 6 in the camera module holder 5 such that a lens assembly 2 is formed. The method further includes the step of mounting S300 the PCB assembly 3 to the camera module holder 5 such that the image sensor 4 faces the camera lens 6, such that vehicle camera module 1 is formed.

The PCB assembly 5 is positioned between at least three guide arms 8a, 8b, 8c of the camera module holder 5, where the guide arms 8a, 8b, 8c at least partly extend parallel to the longitudinal extension L. The method further includes mounting S400 the vehicle camera module 1 to the camera housing 13 such that a part of the lens assembly 2 protrudes via an aperture 14 in the camera housing 13, and mounting S500 the holding member 15 to the camera housing 13 such that it is in retaining contact with the guide arms 8a, 8b, 8c while maintaining a certain distance to the PCB assembly 3 such that the vehicle camera module 1 is securely fixed in the camera housing 13.

The present disclosure is not limited to the examples above, but may vary freely within the scope of the appended claims. For example, many other examples of how a holding member can be formed are conceivable. Combinations of the examples disclosed above are of course possible, and for example different types of holding arms can be used.

With reference to FIG. 1, the digital camera device 12 may be of any suitable kind, and may be placed in any suitable position in the vehicle 30, for example at the ceiling 20, windshield 21, rear window or the dashboard 22.

According to some aspects of embodiments of the present invention, the digital camera device 12 includes a power assembly, an interface assembly and a control unit, which all are positioned at and/or within the camera housing.

According to some aspects of embodiments of the present invention, the camera housing 13 is made in a plastic material.

According to some aspects, the camera module holder is formed in one piece in a resilient material.

A part at least partly extending in a certain direction means that the part may extend parallel to the direction or at an angle to the direction, the angle falling below 90°, and/or that at least one sub-part of the part extends in the direction.

In FIG. 2, a connector part 31 is shown, being a component mounted to the PCB assembly 3. The connector part 31 is according to some aspects adapted to receive an incoming connector (not shown), where the incoming connector is adapted to connect the PCB assembly to other components such as for example a control unit. Depending on the properties of the incoming connector, the guide arm 8a, 8b, 8c with their module guides 28a, 28b, 28c, as well as the guiding ridges 29a, 29b, 29c, may have to be positioned in another manner. The holding member 15 may also have to be adapted accordingly. According to some aspects, an incoming connector can be formed by the holding member, such that the PCB assembly is connected to the incoming connector when the holding member is mounted. A signal cable then runs from the incoming connector to other components such as for example a control unit.

According to some aspects of embodiments of the present invention, each has a spherical shape, and each has a U-shape or V-shape.

The PCB assembly 3 can include one or more separate PCB:s that can be positioned beside each other and/or in a stacked manner.

According to some aspects of embodiments of the present invention, although the holding member 5 is adapted to be fastened to the camera housing 13 while maintaining a certain distance to the PCB assembly 3, the vehicle camera device 12 can include a connecting member positioned between the holding member 5 and the PCB assembly 3, where the connecting member may constitute a thermal connection.

While the above description constitutes the preferred embodiment of the present invention, it will be appreciated that the invention is susceptible to modification, variation and change without departing from the proper scope and fair meaning of the accompanying claims.

The invention claimed is:

1. A vehicle camera module comprising, a camera module, a camera housing and a holding member,
    the camera module comprises a lens assembly and a printed circuit board assembly to which an image sensor and associated components are mounted, the lens assembly comprises a camera module holder and a camera lens, the camera lens having a longitudinal extension and a lens aperture, wherein the camera lens at least partly is housed in the camera module holder, and where the camera module holder forms at least two guide arms that are adapted to extend past corresponding edges of the printed circuit board assembly, the printed circuit board assembly being mounted such that the image sensor faces the camera lens,
    and wherein the camera housing comprises an aperture through which a part of the lens assembly is adapted to protrude, and
    the holding member is adapted to be fastened to the camera housing and to be in retaining contact with the guide arms while maintaining a certain distance to the printed circuit board assembly such that the vehicle camera module is securely fixed in the camera housing.

2. The vehicle camera module according to claim 1, wherein the guide arms at least partly extend parallel to the longitudinal extension.

3. The vehicle camera module according to claim 1, wherein the guide arms are adapted to stay clear from the printed circuit board assembly edges.

4. The vehicle camera device according to claim 1, wherein each of the guide arms comprises a contact surface that is adapted to contact the holding member.

5. The vehicle camera device according to claim 1, wherein the holding member comprises a main part and a holding arm for each of the guide arms, where each of the holding arms extends from the main part towards the corresponding contact surface in a direction parallel to the longitudinal extension and is adapted to abut a corresponding contact surface.

6. The vehicle camera device according to claim 5, wherein each of the holding arms also protrudes radially outwards from the main part.

7. The vehicle camera device according to claim 5, wherein each of the holding arms is formed separately and attached to the main part.

8. The vehicle camera device according to claim 1, wherein the holding member is formed of a metal.

9. The vehicle camera device according to claim 1, wherein the holding member is formed of a rubber material or a plastic material.

10. The vehicle camera device according to 1, wherein the holding member comprises screw apertures adapted to receive fastening screws to be attached to screw receiving flanges comprised in the camera housing, securing the holding member towards the camera housing and the guide arms.

11. The vehicle camera device according to claim 10, wherein each of the screw apertures is formed of separate metal inserts.

12. The vehicle camera device according to claim 1, wherein the holding member comprises attachment arms that are adapted to extend towards receiving flanges comprised in the camera housing, the attachment arms and the receiving flanges being arranged for a snap-fit connection that is adapted to secure the holding member towards the camera housing and the guide arms.

13. The vehicle camera device according to claim 1, wherein the camera module holder comprises at least three module guides, where each of the module guides is adapted to be received in a corresponding guiding ridge comprised in the camera housing.

* * * * *